(12) United States Patent
Otto et al.

(10) Patent No.: US 6,358,578 B1
(45) Date of Patent: *Mar. 19, 2002

(54) METHOD FOR THE PRODUCTION OF POLYESTER WITH MIXED CATALYSTS

(75) Inventors: Brigitta Otto, Milow; Ulrich Thiele, Bruchkoebel; Jens Schiebisch, Gelnhausen, all of (DE)

(73) Assignee: Zimmer Aktiengesellschaft, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,892

(22) Filed: Jun. 12, 1998

(30) Foreign Application Priority Data

Dec. 2, 1997 (DE) ................................. 197 53 378

(51) Int. Cl.⁷ ............................................. B29D 22/00
(52) U.S. Cl. ...................................... 428/35.7; 528/271
(58) Field of Search ........................... 428/35.7, 36.92; 528/271, 272, 274

(56) References Cited

U.S. PATENT DOCUMENTS 3,617,226 A * 11/1971 List et al. ................... 422/199
4,029,593 A * 6/1977 Schapel et al. ............. 252/182
4,089,906 A * 5/1978 Singh et al. ................ 260/609
5,233,106 A * 8/1993 Dafinger et al. ............ 570/176
5,476,919 A * 12/1995 Schaeffer .................... 528/274
5,772,056 A * 6/1998 Slat .......................... 215/12.2

FOREIGN PATENT DOCUMENTS

| JP | 63-218750 | 9/1988 |
| RU | 495333 | 5/1976 |
| RU | 759541 | 8/1980 |

* cited by examiner

Primary Examiner—Harold Pyon
Assistant Examiner—Sow-Fun Hon
(74) Attorney, Agent, or Firm—McDonnell Boehnen Hulbert & Berghoff

(57) ABSTRACT

The present invention comprises a method of producing polyester transesterification of at least a dicarboxylic acid dialkyl ester or esterification of at least a dicarboxylic acid with at least a diol and subsequent precondensation and polycondensation in the presence of the usual catalysts, whereby the polycondensation and optionally the esterification take place in the presence of an additional carbon containing co-catalyst, preferably activated charcoal with a specific surface area of more than 500 $m^2/g$ and an average grain size of less than 2 $\mu$m.

13 Claims, No Drawings

METHOD FOR THE PRODUCTION OF POLYESTER WITH MIXED CATALYSTS

BACKGROUND OF THE INVENTION

1. Field of the Invention

The invention concerns a method for the production of polyester by transesterification of at least a dicarboxylic acid dialkyl ester or esterification of at least a dicarboxylic acid with at least a diol, and subsequent pre-condensation and polycondensation in the presence of the usual catalysts as well as an additional co-catalyst, and the use of this polyester to produce films, bottles, molded articles or fibers.

2. Description of the Related Art

The production of polyesters in general takes place by means of the conversion of a diol with a dicarboxylic acid or a dicarboxylic acid ester, e.g., dimethyl ester. Initially the diol diester of the dicarboxylic acid is formed, which is then polycondensed by a single- or multi-staged process at increasing temperatures under diminishing pressure, whereby diol and water are liberated. Compounds of Ti, Mn, Mg, Ca, Li, Co and/or Zn are used as catalysts for transesterification, compounds of Sb, Ti, Ge and/or Sn are used for the esterification, and compounds of Sb, Ti, Pb, Ge, Zn and/or Sn or a zeolite are used for the polycondensation, whereby the quantity of metal in the catalyst used for the polycondensation alone can amount to up to 500 ppm relative to polyester. Antimony compounds, as the most frequently used esterification and polycondensation catalysts in the production of polyester, are required in quantities of approximately 150–250 ppm antimony, but concentrations of more than 200 ppm antimony are undesirable, in particular for using polyester for foodstuffs packagings.

From the literature (Derwent-abstract No. 81-33905 D of SU 759541 B1) it is known that the transesterification of dimethyl terephthalate with ethylene glycol can be carried out in the presence of a mixture of titanium tetrabutylate and activated charcoal at a ratio by weight of approximately 0.017:1, whereby very high quantities of approximately 2 weight % activated charcoal (relative to dialkyl ester) are employed. The activated charcoal serves as an agent to influence the color.

In another method (Derwent abstract No. 76-88266X of SU 495333 A) to produce PVC plasticizers, mixtures of di- and tricarboxylic acid methyl esters are transesterified with neopentyl glycol in the presence of zinc acetate and activated charcoal. According to the patent, approximately 0.6 weight % zinc acetate and approximately 1.2 weight % activated charcoal (relative to methyl ester) are required. A further disclosure (Derwent abstract No. 88-297391 of JP 63 218750 A) specifies the production of low molecular weight plasticizers through co-polymerization of adipic acid and hydroxy stearic acid with butylene glycol and ethyl hexanol in the presence of approximately 0.045 weight % dibutyl tin oxide and approximately 0.9 weight % activated charcoal (relative to the sum of the acids). To date nothing is known, however, as far as a specific catalytic activity of activated charcoal and/or its use as a co-catalyst when polycondensing linear polyester is concerned.

We recognized that prior art methods of producing polyesters resulted in a product having an amount of catalytic metal compounds (and other harmful substances) that would be desirable to reduce to make a safer product for use, for example, in the packaging of foodstuffs. The present invention accomplishes this goal.

SUMMARY OF THE INVENTION

The present invention comprises a method of producing polyester for use, in particular, in bottles, films, and miscellaneous foodstuffs packaging as well as filaments and fibers, which polyester has a reduced content of catalytic metal compounds and possibly other substances that may be harmful to health as compared to polyesters produced by prior art methods.

The method of the present invention is characterized by the fact that polycondensation and, optionally, esterification take place in the presence of an additional carbon containing co-catalyst. The carbon containing co-catalyst is preferably activated charcoal with a specific surface area of more than 500 m$^2$/g and an average grain size of less than 2 μm.

The foregoing merely summarizes certain aspects of the present invention and is not intended, nor should it be construed, as limiting the invention in any manner. The invention is described in more detail below.

DETAILED DESCRIPTION OF THE PREFERRED EMBODIMENTS

Surprisingly, it was found that activated charcoal, in conjunction with the usual catalytic metal compounds, acts as a co-catalyst for the polycondensation and/or the esterification reaction. The catalytic effect can be attributed to the properties of the activated charcoal. The basis for the secondary structure of the activated charcoal lies in the given random arrangement of graphite crystalites and amorphous carbon. Gaps and pores are located between these individual particles (micropores<2 nm, mesopores 2–50 nm, macropores>50 nm), which form a very great cavity system and result in the large, specific surface area typical of activated charcoal. As a result of the special crystal structure of the activated charcoal, the carbon atoms positioned at the edge of the layer structure are chemically unsaturated and form so called active centers that are the basis for the reactivity of the activated charcoal. Activated charcoal having a specific surface area of more than 500 m$^2$/g (preferably more than 900 m$^2$/g) is suited to function as a co-catalyst.

An elemental analysis reveals that, in addition to hydrogen, oxygen and nitrogen, other inorganic components originating from the raw material of the activated charcoal, such as Ca, K, Na, Si, Fe, Mg, Mn, Zn and Cl, can be found in trace amounts in the activated charcoal. (Hartmut v. Kienle, Erich Baeder; Activated Charcoal and its Industrial Applications, Ferdinand Enke Verlag/Stuttgart, (1980)). The preferred activated charcoal has a quality such as is used commercially for treating drinking water, for the foodstuffs industry, or for medicinal purposes. Such activated charcoal provides the advantage of being free of polycyclic aromatic compounds that are harmful to health, such as benzopyrene, so that the polyester that is produced can be used without problems for foodstuffs packaging.

Since the catalytic activity of the activated charcoal and the coloration of polyester mixed with activated charcoal is to a great degree dependent on the size of the grain, the activated charcoal according to the invention is selected so as to have a grain size (arithmetic mean) d$_{50}$ of less than 2 μm, preferably less than 0.5 μm. Preferably, the selection of the grain size takes place by milling the powdered activated charcoal in a liquid medium (preferably the diol that is the basis of the polyester, e.g., for polyethylene terephthalate or -naphthalate in ethylene glycol).

The carbon containing co-catalyst is used in addition to the usual polycondensation catalysts, such as compounds of Sb, Ti, Pb, Ge, Zn and/or Sn or a Zeolite, and, optionally, in addition to the usual esterification catalysts, such as compounds of Sb, Ti, Ge and/or Sn, in quantities of 0.1 to 1000 ppm (preferably 0.1 to 500 ppm) co-catalyst relative to polyester at a ratio by weight of catalyst to co-catalyst of 1 to from 0.01 to 5 (preferably 1 to from 0.01 to 3).

As the concentration of co-catalyst increases, the concentration of the usual catalysts used for the polycondensation or esterification can be reduced, whereby preferably 1 to 3 parts by weight of activated charcoal replaces approximately 1 part by weight of the metal of the usual catalyst. The quantity of the usual catalyst that is used together with the co-catalyst should be at least approximately 50% of the quantity that would be required without the co-catalyst. The concentration of co-catalyst can be selected specifically for each application by routine experimentation. Experience has shown that for the production of transparent foodstuffs packaging such as beverage bottles, a concentration range of 0.1 to 50 ppm (preferably 0.5–15 ppm) of activated charcoal is favorable, whereas to produce carrier foils for the film industry concentrations of 10–500 ppm are advantageous. In order to produce mass-colored, black textile fibers or other molded articles, the concentration can be increased up to 1000 ppm. Still higher concentrations of activated charcoal do not provide further advantages in regard to catalytic activity, but can be taken into consideration with regard to acting as a black colorant.

To produce polyester or copolyester according to the invention through transesterification of at least a dicarboxylic acid dialkyl ester or by esterification of at least a dicarboxylic acid with at least a diol and subsequent single or multi-stage polycondensation, the addition of co-catalyst or activated charcoal and of the usual catalysts required for the polycondensation and, optionally, for the esterification, take place separate from one another or together as a suspension, preferably in the diol that is the base for the polyester. For polyester produced by the esterification process, the activated charcoal suspension can be added before, during, or after the esterification or before or during the first half (relative to dwell time) of the polycondensation. In transesterification process the addition of activated charcoal should take place only after blocking the transesterification catalysts, since the catalytic activity of the activated charcoal for the polycondensation is greatly inhibited by the phosphorus compounds that are usually used for this purpose.

Stabilizers such as phosphoric acid, phosphorous acid, phosphonic acid, carboxyphosphonic acid and their derivatives that are often employed for the production of polyester, in particular for packagings, should not be added at the same time as the addition of the activated charcoal and, relative to the course of the polyester production, be as far apart from it as possible. Thus, for example, the activated charcoal can be added at the beginning of the esterification process to the monomer mixture, and the phosphorus containing stabilizer added at a quantity of 1–50 ppm (preferably 1–10 ppm) phosphorus relative to polyester, at the earliest after completing the supply of the entire monomer mixture, corresponding to a degree of esterification of 60 to 98%. For non-catalyzed esterification, the phosphorus containing stabilizer can be added at the beginning of the esterification, and at the end of the esterification the activated charcoal can be added together with the usual polycondensation catalyst. Other variations are also possible.

Polyesters are hereby to be understood as referring to polymers of terephthalic acid or 2,6-naphthalene dicarboxylic acid and ethylene glycol, 1,3-propandiol, 1,4-butandiol and/or 1,4-cyclohexanedimethanol, and their copolymers with other dicarboxylic acids such as, for example, isophthalic acid, terephthalic acid, 1,4-cyclohexanedicarboxylic acid, 2,6-naphthalindicarboxylic acid, p-hydroxybenzoic acid, 4,4'-bisphenyldicarboxylic acid, adipic acid and/or diols such as diethylene glycol, 1,4-butanediol, 1,4-cyclohexanedimethanol, and polyglycols with a molecular weight under 1000. The preferred polyester is polyethylene terephthalate, which contains 0.5–5.0 weight % diethylene glycol and 0–5.0 weight % isophthalic acid, 2,6-naphthalene dicarboxylic acid, p-hydroxybenzoic acid and/or 1,4-cyclohexanedimethanol as a comonomer.

Depending on the application of the polyester, it may be advantageous to compensate for the graying of the polyester, that arises from light absorption by the finely distributed activated charcoal, by means of the addition of an optical brightener such as OB1 from Eastman Chemical B.V., The Haag/Netherlands. This is particularly expedient for the production of polyesters for transparent packaging. It may also be advantageous to add a blue toner to the polyester produced according to the invention. Organic blue and blue red dyes in lower ppm quantities, and/or 0–30 ppm cobalt in the form of a salt soluble in polyester are suitable for this purpose. The addition takes place together with the usual catalyst, but can also be done at any desired point in time, in particular at a later point in time.

Also, it is possible to add polyfunctional alcohols such as tri- or tetrahydroxyalkane or polyfunctional carboxylic acids in concentrations of up to 300 ppm relative to the polyester. As a result of this measure, the concentration of the usual catalysts can be reduced even farther. This measure is of particular interest if the polyester is granulated after the melt polycondensation and the granulate is crystallized and post condensed in the solid phase, since an acceleration of the solid phase polycondensation is simultaneously achieved.

As a result of the addition of a co-catalyst according to the invention, the quantity of one or more of the usual catalysts required for the production of a given polyester quality can be reduced by up to half, without impairing the mechanical, chemical, or thermal properties of the polyester. The optical properties of the polyester can be adjusted here in a controlled manner interdependently with the activated charcoal concentration from a minimal change all the way to black coloration, depending on the application.

Polyethylene terephthalate and its copolymers produced according to the invention are distinguished by a carboxyl end group content of less than 40 mmol/kg, preferably 22–38 mmol/kg. Polyethylene terephthalate with 0.5–2 weight % diethylene glycol and 0–5 weight % isophthalic acid and/or 0–5 weight % 1,4-cyclohexanedimethanol, produced with a maximum of 15 ppm of activated charcoal co-catalyst according to the invention and an antimony compound as the usual catalyst, has a turbidity value of less than 10 NTU and is well suited for use as foodstuffs packaging. Generally, the polyester according to the invention produced with the use of 0.1 to 1000 ppm of activated charcoal with the previously indicated properties can be processed into films, bottles and other molded articles.

The following Examples are presented for illustrative purposes only and are not intended, nor should they be construed as limiting the invention in any manner.

EXAMPLES

The characteristic values presented herein were determined as follows:

The intrinsic viscosity (I.V.) was measured at 25° C. in a solution of 500 mg polyester in 100 ml of a mixture composed of phenol and 1,2 dichlorobenzene (3:2 parts by weight).

The COOH end group concentration was determined by means of photometric titration of a solution of polyester in a mixture of o-cresol and chloroform (70:30 parts by weight) with 0.05 N ethanolic potassium hydroxide solution using bromothymol blue as indicator,.

Free ethylene glycol (EG) was determined by conversion with periodic acid to formaldehyde, reduction of the excess periodic acid with potassium iodide, and titration of the liberated iodine.

The determination of diethylene glycol (DEG), isophthalic acid (IPA) and 1,4 cyclohexane dimethanol (CHDM) in polyester was carried out by means of gas chromatography following the previous methanolysis of 1 g polyester in 30 ml methanol with the addition of 50 mg/l zinc acetate in a carius tube at 200° C.

The saponification value was determined by saponification with potassium hydroxide in n-propanol and potentiometric titration. The acid number was determined by potentiometric titration in dimethyl formamide. The degree of esterification (U) was calculated using the saponification value (Vz) and the acid number (Sz) of the reaction mixture according to U=(Vz−Sz)·100/Vz.

The measurement of the degree of turbidity in "nephelometric turbidity units" (NTU) was carried out in a 10 weight % solution of polyester in phenol / 1,2 dichlorobenzene (3:2 parts by weight) with a nephelometer from the Hach company (type XR, according to U.S. Pat. No. 4,198,161) in a 22.2 mm diameter cuvette, analogous to the norm used for water DIN 38404, part 2. The intensity of the scattered light was measured in comparison to a formazine standard solution, minus the value of the solvent (ca. 0.3 NTU).

The measurement of the color values L and b was carried out according to Hunter. The polyester chips were first crystallized in a drying chamber at 135±5° C. for one hour. The color values were then determined by having the color tone of the polyester sample measured with three photo cells in a trichromatic color measuring device, each photocell having a red, green or blue filter placed in front (X, Y and Z values). The evaluation resulted according to the formula by Hunter, whereby $$L = 10 \cdot \sqrt{Y}$$

and $$L = \frac{7.0}{\sqrt{Y}} \cdot (Y - 0.8467 \cdot Z)$$

The acetaldehyde was expelled from the polyester by heating in a closed vessel and the acetaldehyde content in the gas phase of the vessel determined by gas chromatography by Head Space Analysis. (Gas chromatograph with FID and Head Space Injection System HS40, Perkin Elmer; carrier gas: nitrogen; column: 1.5 m stainless steel, filled with Porapak Q. 80–100 mesh; sample quantity: 2 g; heating temperature: 150° C.; duration of heating: 90 min).

Example 1

Production of an Activated Charcoal Suspension

Activated charcoal BKP3 from A.U.G Neue Aktivkohle und Umweltschutz GmbH, Premnitz, Del., with the following quality (manufacturer's data) was used:

| Type | Powder | measuring method |
|---|---|---|
| Surface area m$^2$/g | 1000 | BET, N2 |
| Phenol adsorption (%) | 5 | DIN 19603 |
| moisture when packed (%) | 10 | ASTM D 2867 |
| bulk density g/cm$^3$ | 0.30 | ASTM D-2854 |
| inorganic components (wt. %) | 10 | by ashing (own analysis) |

A 14 weight % activated charcoal suspension was prepared in ethylene glycol, which was then introduced into the vessel of a bead mill. The suspension was transported in a closed cycle by means of a hose pump with a flow rate of 180–300 kg/h through the water cooled bead mill (DCP SF from the Drais Company, Mannheim, Del., with 0.3–0.4 mm diameter Draison-grinding beads, degree of filling: 91%, screen insert: 0.15 mm mesh width) at 1 1.1 m/s peripheral rotating speed (1250 rpm) and a maximal product temperature of 45.5° C. for 90 minutes. Then the suspension was diluted with ethylene glycol to approximately 8 weight %, ground another 60 minutes in the closed cycle, and then introduced into a container.

The grain size analysis of the glycolic suspension provided the following values, whereby the measurement of the grain size distribution was carried out with a CAPA 700 particle counting device (dispersion medium: methanol, density 0.79 g/cm$^3$, viscosity 0.55 cP, density of the activated charcoal 1.90 g/cm$^3$, centrifuge speed 2000 rpm, layer thickness 10 mm): average grain size $d_{50}$=0.46 μm

| grain size μm | proportion of grains (weight %) |
|---|---|
| <0.4 | 45 |
| 0.4–1 | 41 |
| 1–2 | 14 |

Comparative Examples 2–6 and Example 7

Esterification and Polycondensation Test

The starting product was a completely catalyst free esterification product consisting of terephthalicic acid and ethylene glycol with the following analytical data:

| | |
|---|---|
| I.V. | 0.20 dl/g |
| Vz | 565 mg KOH/g |
| Sz | 22 mg KOH/g |
| U | 96% |
| free EG | 0.12 weight % |
| DEG | 0.77 weight % |

After carefully flushing the reactor with nitrogen, each 100 g of the esterification product was melted together with catalyst and the activated charcoal suspension from Example 1 at 275° C. for 50 minutes under atmospheric pressure. The pressure was then gradually lowered over a 50 minute period to 0.1 bar, the temperature raised to 280° C., and the polycondensation continued for an additional 135 minutes. The polycondensate solidified with the help of liquid nitrogen was ground and analyzed. The results are summarized in table 1.

TABLE 1

| Example No. | Catalyst | Catalyst quantity (ppm)* | I.V. dl/g) | delta I.V (dl/g)** | COOH (mmol/kg) | DEG. (%) |
|---|---|---|---|---|---|---|
| 2 | none | 0 | 0.357 | — | 12 | 0.99 |
| 3 | Sb | 100 | 0.575 | 0.218 | 11 | 1.03 |
| 4 | Sb | 150 | 0.630 | 0.273 | 8 | 0.90 |
| 5 | AK | 100 | 0.403 | 0.046 | 13 | 1.00 |
| 6 | AK | 200 | 0.505 | 0.148 | 15 | 1.08 |
| 7 | Sb/AK | 150/20 | 0.645 | 0.288 | 12 | 1.02 |

AK = activated charcoal as a glycolic suspension
Sb = antimony triacetate (S 21 from Elf Atochem, Philadelphia, USA) as a glycolic suspension
*relative to polyester, with antimony triacetate as Sb, with activated charcoal as dry substance
**difference relative to example 2

Comparative Example 8 and Examples 9 and 10

250 kg of a homogeneous paste of terephthalic acid and ethylene glycol at a molecular ratio of 1: 1.1 as well as the catalyst and the activated charcoal as a glycolic suspension (example 1) and the blue toner and/or the optical brightener were continually fed over an 80 minute period at 260° C. and atmospheric pressure into an esterification reactor filled with approximately 30% of the esterification product of the previous analogous charge. Further esterification then took place for 30 minutes with temperature increasing to 270° C., and shortly before termination of the esterification the stabilizer was added. During the entire esterification the reaction water formed was separated on a column. Then the reaction pressure was reduced to 10 mbar within 20 minutes and the reaction mixture transferred into a polycondensation reactor and polycondensed at 280–285° C. and 2–3 mbar during the indicated PK duration. After reaching the desired I.V., the vacuum was adjusted to approximately 10 mbar and the polyester melt was supplied to an underwater granulator by means of a gear pump and granulated. The results are illustrated in Table 2.

TABLE 2

| Example No. | Type of additive | qty of additive (ppm) | PK duration (min) | I.V. (dl/g) | COOH (mmol/kg) | IPA/DEG (wt %) | Turbidity (NTU) | color (L/b) |
|---|---|---|---|---|---|---|---|---|
| 8 | Sb | 200 | 145 | 0.62 | 22 | 2/1.2 | 3.8 | 81/1.0 |
|   | P | 15 | | | | | | |
|   | Co | 10 | | | | | | |
| 9 | Sb | 188 | 145 | 0.62 | 22 | 2/1.25 | 7.1 | 62/−2.5 |
|   | AK | 12 | | | | | | |
|   | P | 15 | | | | | | |
|   | Co | 10 | | | | | | |
|   | OB | 12 | | | | | | |
| 10 | Sb | 150 | 120 | 0.638 | 23 | 2/1.3 | — | 27/−5.5 |
|   | AK | 500 | | | | | | |
|   | P | 17 | | | | | | |
|   | Co | 10 | | | | | | |

Table 2 definitions are the same as table 1 except for:
P: Addition as $H_3PO_4$, 10% solution in ethylene glycol
Co: Addition as cobalt acetate, 2% solution in ethylene glycol
OB: Optical brightener (Eastobrite OB 1) as powder or as suspension together with the activated charcoal.

The amorphous polyethylene terephthalate granulate produced in this manner was fed to a as condensation. With a throughput of 34 kg/h, the PET-chips were led in a countercurrent to a nitrogen flow into a pre-crystallizer and then into a main crystallizer, whereby the product temperature in the pre-crystallizer was 185° C., and in the crystallizer the temperature was 210° C. A feed screw was then used to supply the product into the solid phase condenser, in which the PET was polycondensed under nitrogen at temperatures of approximately 205° C. up to an average I.V. of 0.80 dl/g. The results are illustrated in table 3.

TABLE 3

| Example No. | 7 (comparison) | 8 |
|---|---|---|
| IV (dl/g) | 0.78 | 0.8 |
| COOH (mmol/kg) | 14 | 10 |
| Color L | 88 | 72 |
| Color b | 2.8 | −0.7 |
| turbidity (NTU) | 3.9 | 6.8 |
| acetaldehyde (ppm) | 1.1 | 1.0 |

We claim:

1. In a method of producing polyester from monomers of terephthalic acid, 2,6-naphthalene dicarboxylic acid, or both suitable for processing into films, bottles, molded articles, or fibers by (1) transesterification of at least a dicarboxylic acid ester or esterification of at least a dicarboxylic acid with at least a diol and (2) subsequent precondensation and polycondensation in the presence of a polycondensation catalyst, the improvement comprising catalyzing polycondensation with a carbon-containing co-catalyst in addition to the polycondensation catalyst, wherein the carbon-containing co-catalyst is activated charcoal added in quantities of 0.1 to 1000 ppm relative to the polyester and at a ratio by weight of catalyst to co-catalyst of 1:0.01 to 1:5 and (a) when the polyester is produced by esterification the carbon-containing co-catalyst is added before, during or after esterification and/or before or during the first half of the polycondensation and (b) when the polyester is produced by transesterification the carbon-containing co-catalyst is added after transesterification and before or during the first half of the polycondensation, wherein the polyester product has an intrinsic viscosity of at least 0.4 dL/g.

2. The method according to claim 1, wherein the co-catalyst is activated charcoal with a specific surface area of more than 500 $m^2/g$ and an average grain size of less than 2 μm.

3. The method according to claim 2, wherein the activated charcoal has a specific surface area of more than 900 $m^2/g$ and an average grain size of less than 0.5 μm.

4. The method according to claim 1, wherein the co-catalyst is added in quantities of 0.1 to 500 ppm and at a ratio by weight of catalyst to co-catalyst of 1:0.01 to 1:3.

5. The method according to claim 1, wherein during the production of the polyester, a phosphorus containing stabilizer is added at a point in time different from the time at which the co-catalyst is added.

6. The method according to claim 1, wherein the polyester is processed into films, bottles, molded articles or fibers.

7. Polyester produced according to the method in claim 1, wherein the carbon-containing cocatalyst is in the form of 0.1 to 1000 ppm activated charcoal with a specific surface area of more than 500 $m^2/g$ and an average grain size of less than 2 μm.

8. A film, bottle, molded article, or fiber comprising the polyester according to claim 7.

9. The method according to any one of claims 1, 2, 4, or 5 wherein the polyester is poly(ethylene terephthalate).

10. A polyester produced according to any one of claims 1, 2, 4, or 5.

11. A poly(ethylene terephthalate) produced according to the method of claim 9.

12. A film, bottle, molded article or fiber comprising the polyester according to claim 9.

13. A film, bottle, molded article or fiber comprising the polyester according to claim 10.

* * * * *